Oct. 28, 1969        M. KAPILOW ET AL        3,475,263
SPLICE PATCH FOR SUPER 8 FILM
Filed Dec. 17, 1965        2 Sheets-Sheet 1
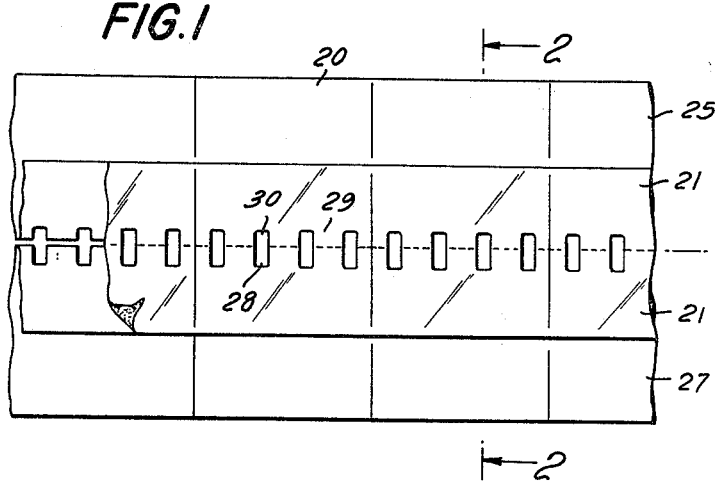
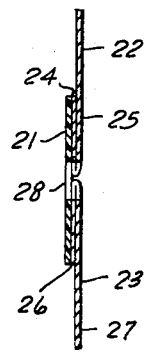
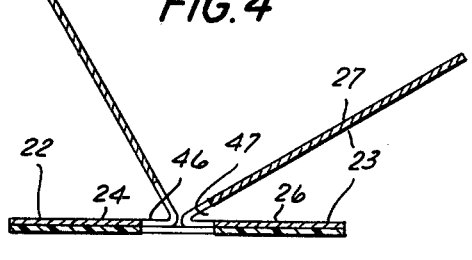
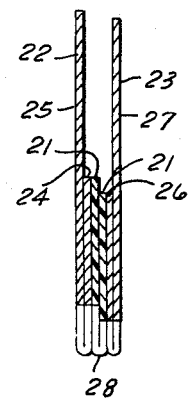
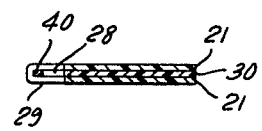
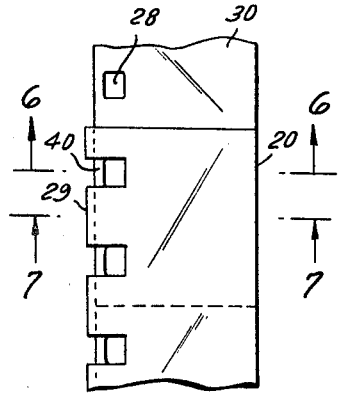
INVENTORS
EUGENE MARTINEZ
ROBERT H. REIBEL
MARVIN KAPILOW
BY Kane, Dalsimer, Kane & Smith
ATTORNEYS

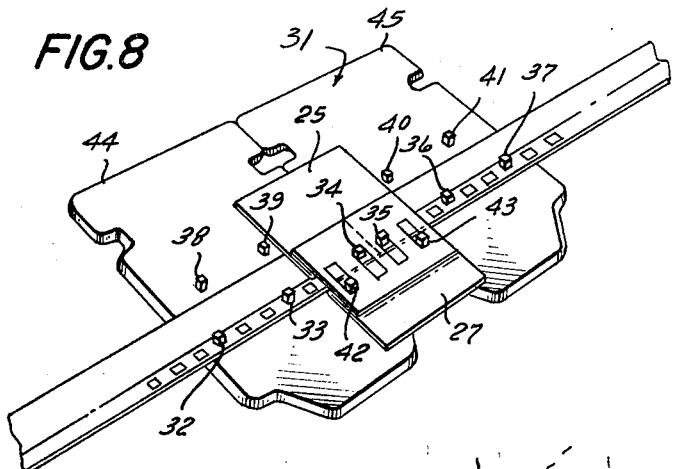
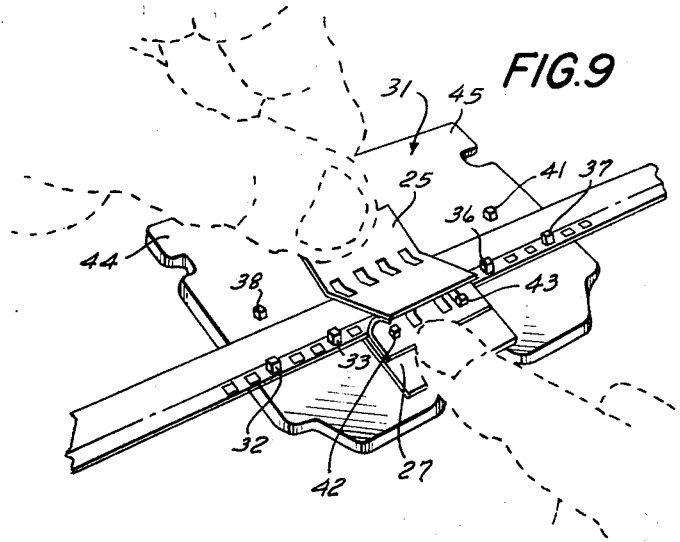
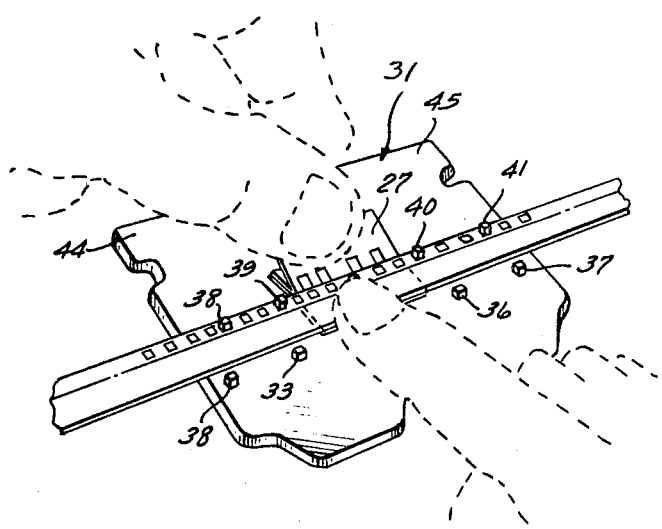

United States Patent Office 3,475,263
Patented Oct. 28, 1969

3,475,263
SPLICE PATCH FOR SUPER 8 FILM
Marvin Kapilow, 8 Sound Road, Rye, N.Y. 10580;
Eugene Martinez, Woodbine Road, Irvington,
N.Y. 10533; and Robert H. Reibel, Mount Airy
Road, Croton-on-Hudson, N.Y. 10520
Filed Dec. 17, 1965, Ser. No. 514,601
Int. Cl. B32b 7/10
U.S. Cl. 161—102                                         1 Claim

ABSTRACT OF THE DISCLOSURE

A splice patch including a substantially rectangular tape having dimensions dependent upon the dimensions of the film to be spliced. Patches made of flexible material having a roll of aligned sprocket receiving holes extending in the same direction as one of the axes of the tape and proximate thereto. A portion of the tape is coated with an adhesive. The size of the openings in the tape correspond at least to the size of the sprocket receiving holes of the film to be spliced. A liner for the tape covers and protects a substantial portion of the adhesive coated surface of the tape.

---

This invention relates to an improved splice patch for motion picture film and particularly suited for splicing super 8 movie film, manufactured by Eastman Kodak Co., Rochester, N.Y., as well as other type movie film.

The recent advent of super 8 film has to a great extent provided a revolutionary contribution to the motion picture film industry. The sprocket holes of this film are smaller and closer to the side edge which gives a picture area much larger than previously obtainable. The lack of sufficient area between the sprocket holes and the adjacent edge of the film and other dimensional properties of this film has rendered existing dry splice techniques inapplicable.

The present invention alleviates the existing situation by providing an improvement in dry splice patch construction capable of efficiently and quickly producing, without the necessity of skill, an effective and durable splice particularly of super 8 film as well as others.

With these and other objects in mind, attention is directed to the attached sheets of drawings which illustrate the invention and in which:

FIG. 1 is a fragmentary plan view of a splice patch connected in series to other similar splice patches along opposed lines of weakening to thereby form a strip of splice patches of any selectable number;

FIG. 2 is a cross-sectional view taken along the line 2—2 of FIG. 1;

FIG. 3 is a cross-sectional end view of the splice patch folded upon itself along the juncture created by the adjacent hinged corners of the splice liner panels;

FIG. 4 is a cross-sectional elevation of the splice patch with the non-adhesive side of the tape resting on a horizontal plane and showing the location of the tab of the liner in that position;

FIG. 5 is a fragmentary view of a butt splice with a phantom line to indicate the joining edge of the two strips of film;

FIG. 6 is a cross-sectional view of FIG. 5 taken along the plane of line 6—6 and shows the manner in which the tape engages the film and is associated with the adjacent sprocket holes;

FIG. 7 is a cross-sectional view of FIG. 5 taken along the plane of line 7—7;

FIG. 8 illustrates in perspective the first step in the method of forming a super 8 film splice by means of this invention;

FIG. 9 and FIG. 10 are similar views illustrating subsequent steps sequentially followed in this method of forming a super 8 film splice.

Basically, this invention is directed to a splice patch for splicing numerous types of motion picture film and in particular super 8 movie film. The splice patch 20 is comprised of a tape 21 of transparent material, and a liner 22–23 covering the adhesive side of the tape 21, with sprocket holes 28 punched in the tape 21 and the liner 22–23 so that when the tape is applied to the film these holes 28 will align themselves with the sprocket holes of the film.

Referring now to the drawings, in FIG. 1 is illustrated a series of splice patches, one of which is indicated by a numeral 20 and which are connected by several cut or scored lines of weakening to provide a splice patch of predetermined length.

The tape 21 may be advantageously composed of a polyester resin developed by E. I. du Pont de Nemours & Co. and known as "Mylar" which is a material made from polyethylene terephthalate, which in turn is a polymer formed by the combustion reaction between ethylene glycol and terephthalic acid. Naturally, other materials having the desired properties may be employed for such purposes. This tape has a coating on one side of a suitable adhesive substance having bonding affinity with movie film.

The liner 22–23, which may be composed of any suitable material either porous or non-porous, covers the tape on the adhesive side. As shown, the liner is conveniently composed of two parts 22 and 23. Each part includes a portion, 24 and 26 respectively, covering the adhesive surface of the tape. In addition, each part is provided with the respective tab 25 and 27 for gripping and removing the liner from the adhesive surface. In FIG. 4 numeral 23 represents the reference side of the liner and may be provided with a color code designation to indicate this condition. Each two liner parts 22 and 23 are provided with a row of opposed holes 46 and 47, respectively, so that when the liner is covering the adhesive side of the tape, these holes 46 and 47 combine to form a single row of holes equal in dimension to and aligned with the row of sprocket holes 28 in the tape.

The sprocket receiving holes 28 of the tape are aligned along a common central axis of the tape. The holes 28 are rectangular, being at least as long as a sprocket hole in the film and at least twice as wide as the sprocket hole. In this connection, the width of the holes 28 in a successful embodiment of this invention preferably equals twice the length of the sprocket hole of the movie film, plus twice the distance between the edge of the film and the edge of the sprocket hole plus the width of the film. Therefore, to fit the different size film only the dimensions of the sprocket holes in the tape need be changed.

Referring now to FIGS. 5–7, film 30 is shown spliced by the tape 20, producing a typical butt splice. It will be observed, the folded edge 29 of the tape 20 does not extend to cover the part 40 of the film 30 which is only as wide as the distance between the longitudinal edge of the film and the sprocket hole thereby eliminating a potential zone of weakness on the tape 20. The tape 21, however, completely covers the film 30 where there is no sprocket hole 28, this zone being designated at 29, thereby adding to the strength of the splice.

In forming a super 8 splice, reference should be had to FIGS. 8–10 wherein a splicer 31 is fragmentarily illustrated. The splicer 31 may be made of a suitable material such as plastic or sheet metal and is provided with two rows of registration pins which correspond to the size of the sprocket holes in super 8 film. The first row of pins are designated by the numerals 32, 33, 34, 35, 36, 37.

The second row of pins are designated by the numerals 38, 39, 40, 41. The splicer 31 also contains two large locating prongs 42, 43. The splicer 31 is composed of two separate pivotal plates 44, 45 which abut one another to form a cutting edge between them for trimming the film for a butt splice. The construction and operation of a similar splicer of this type is disclosed in our Patent No. 2,923,195 granted Feb. 2, 1960.

It will suffice to say that one piece of film to be spliced is placed with its sprocket holes on pins 32, 33 and 34. With plate 44 substantially horizontal and plate 45 extending upward, plate 45 is then pivoted downwardly to trim the film. The second piece of film is then placed on pins 35, 36, 37, and trimmed by pivoting plate 44 downwardly relative to plate 45. The two pieces of film are now in position for a butt splice, being end to end and aligned by registration pins.

The reference side 27 of the splice patch is then placed on the two large locating prongs 42, 43 and the registration pins 34 and 35. The splice patch rests on top of the film to be spliced, both the film and the patch being held in place by the registration pins.

The reference side 27 is then held down while the non-reference side tab 25 is pulled away from the film, as in FIG. 9; in the process it frees the adhesive side of the tape which adheres to the film. This adherence is rendered more positive by the application of finger pressure across the tape. This forms the splice on one side of the film, the holes of the tape being maintained in alignment with the holes in the film by the registration pins 34 and 35.

Next, the film is turned over and placed on the second row of registration pins 38, 39, 40, 41 as in FIG. 10. The reference side tab 27 of the patch is then removed from the remaining adhesive surface of the tape and in so doing the tape is folded over onto the film. That adhesive surface is then firmly adhered to the film with the sprocket holes of the tape aligning themselves with the holes of the film.

The splice is now completed with the edge of the film adjacent to the sprocket holes covered by the folded edge of the tape. Thus a strong and durable splice of super 8 film is obtained. By adjusting the size of the sprocket holes in the tape other types of film may also be advantageously spliced in a similar manner.

Thus the above-mentioned objects of the invention, among others, are achieved. The range and scope of the invention are defined in the following claim.

We claim:
1. A splice patch for super 8 film and for similar film having a row of aligned sprocket-receiving holes comprising a substantially transparent rectangular tape of flexible material having a row of aligned sprocket-receiving hole openings extending in the same direction as and proximate to a central longitudinal axis of the tape, a portion of said tape being coated with an adhesive, said openings being spaced from the peripheral edge of said tape, each of said openings being substantially rectangular and extending through the tape, the size of each of the openings in the tape corresponding at least to the size of the sprocket-receiving holes in the film to be spliced, one of the dimensions of the tape openings being equal to at least twice the lateral width of the film hole plus twice the distance from the film hole to the adjacent longitudinal edge of the film plus the thickness of the film so that when the tape is folded over the film and adhered on top and bottom thereto to form a splice, a portion of each opening will be aligned with a sprocket-receiving hole on one side of the film and a portion of the same opening will be aligned with the same sprocket-receiving hole on the under side of the film to cover the film in lateral areas where there is no sprocket hole thereby adding to the strength of the splice and to eliminate zones of weakness at the sprocket holes, a liner for the tape covering and protecting a substantial portion of the adhesive-coated surface of the tape, said liner being formed of two parts, with a side edge of each part extending in the same direction as one of the axes of the tape and in proximate relation with one another, each part of the liner having integrally hinged finger-gripping panels bent back upon the associated part, said liner having a row of sprocket-receiving holes extending therethrough, and the liner holes being aligned with the tape openings and being substantially equal in size to the tape openings.

References Cited

UNITED STATES PATENTS

| 3,424,644 | 1/1969 | Nakagome | 161—406 XR |
| 2,969,106 | 1/1961 | Reibel et al. | 156—157 XR |
| 2,923,195 | 2/1960 | Reibel et al. | 156—502 XR |
| 3,053,711 | 9/1962 | Eagle et al. | 156—502 |

PHILIP DIER, Primary Examiner

U.S. Cl. X.R.

161—112, 406; 156—157, 505